US009518317B2

(12) United States Patent
Eminoglu et al.

(10) Patent No.: US 9,518,317 B2
(45) Date of Patent: Dec. 13, 2016

(54) METHOD OF COATING A COMPONENT, METHOD OF FORMING COOLING HOLES AND A WATER SOLUBLE APERTURE PLUG

(75) Inventors: Cem Murat Eminoglu, Greenville, SC (US); Canan Uslu Hardwicke, Simpsonville, SC (US); Lawrence Matthew Levy, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 100 days.

(21) Appl. No.: 13/469,478

(22) Filed: May 11, 2012

(65) Prior Publication Data

US 2013/0302522 A1    Nov. 14, 2013

(51) Int. Cl.
| | |
|---|---|
| *C23C 16/04* | (2006.01) |
| *C23C 16/00* | (2006.01) |
| *C23C 4/02* | (2006.01) |
| *F01D 5/28* | (2006.01) |

(52) U.S. Cl.
CPC . *C23C 4/02* (2013.01); *C23C 4/01* (2016.01); *C23C 4/073* (2016.01); *F01D 5/286* (2013.01); *F01D 5/288* (2013.01)

(58) Field of Classification Search
CPC .................................................. C23C 4/085
See application file for complete search history.

(56) References Cited

U.S. PATENT DOCUMENTS

| | | | |
|---|---|---|---|
| 4,743,462 A | | 5/1988 | Radzavich et al. |
| 4,913,786 A | * | 4/1990 | Horiki et al. ............... 205/122 |
| 5,413,871 A | * | 5/1995 | Nelson et al. ............... 428/552 |
| 5,902,647 A | | 5/1999 | Venkataramani et al. |

(Continued)

FOREIGN PATENT DOCUMENTS

| | | | |
|---|---|---|---|
| DE | 102009014098 A1 | | 9/2010 |
| WO | WO 00/48846 | * | 8/2000 |
| WO | WO 2011-113833 | * | 9/2011 |

OTHER PUBLICATIONS

Material Safety Data Sheet, Resbond 907GF, dated prepared: Nov. 1, 1985; date revised: May 5, 2005.

(Continued)

*Primary Examiner* — Lisha Jiang
(74) *Attorney, Agent, or Firm* — McNees Wallafce & Nurick, LLC

(57) ABSTRACT

A method for coating a component and forming at least one cooling hole in a component is provided. The method includes providing the component having a surface and including a plurality of apertures formed therein. The method includes masking at least one of the plurality of apertures with a plug comprising a removable material. The method includes applying at least one coating to the surface of the component. The method includes eliminating the plug including removable material leaving open apertures in the surface of the coated component. Also provided is a water-soluble aperture plug including water soluble high temperature resistant filler materials including aluminum oxide, zirconium oxide, magnesium oxide, silicon dioxide, zircon, graphite, tungsten carbide, silicon carbide, silicon nitride, boron nitride, aluminum nitrides and binding agents and dispersants including phosphates, silicates, sugar, salt, gum, resin, polyvinyl alcohol (PVA), polyethylene glycol, and combinations thereof.

14 Claims, 4 Drawing Sheets

(56) References Cited

U.S. PATENT DOCUMENTS

| | | | |
|---|---|---|---|
| 6,024,787 A | | 2/2000 | Lee |
| 6,224,673 B1 | | 5/2001 | Das et al. |
| 6,234,755 B1 | * | 5/2001 | Bunker .................. F01D 5/186 416/241 R |
| 7,125,462 B2 | | 10/2006 | Disteldorf |
| 7,192,622 B2 | | 3/2007 | Fernihough et al. |
| 7,273,942 B1 | | 9/2007 | Dougherty et al. |
| 8,021,719 B2 | | 9/2011 | Graichen |
| 2001/0001897 A1 | | 5/2001 | Zhao et al. |
| 2001/0007708 A1 | * | 7/2001 | Venkataramani et al. .... 428/139 |
| 2004/0023020 A1 | * | 2/2004 | Bose ......................... C23C 4/06 428/323 |
| 2004/0112237 A1 | * | 6/2004 | Chaug et al. ................. 101/483 |
| 2004/0115438 A1 | * | 6/2004 | Gros .......................... 428/422.8 |
| 2005/0100672 A1 | * | 5/2005 | Stankowski et al. ......... 427/282 |
| 2005/0136108 A1 | * | 6/2005 | Yam et al. ................... 424/468 |
| 2007/0087117 A1 | | 4/2007 | Jabado et al. |
| 2008/0220177 A1 | * | 9/2008 | Hass et al. ................... 427/446 |
| 2012/0052200 A1 | * | 3/2012 | Zimmerman .............. 427/248.1 |
| 2013/0156966 A1 | * | 6/2013 | Grohnert et al. ............ 427/446 |

OTHER PUBLICATIONS

Resbond 907GF, Cotronics Corporation, http://www.cotronics.com/vo/cotr/promotion.htm; date published Jul. 5, 2006.

EP Search Report issued on May 19, 2015 in relation to corresponding EP application 13167382.4.

* cited by examiner

METHOD OF COATING A COMPONENT, METHOD OF FORMING COOLING HOLES AND A WATER SOLUBLE APERTURE PLUG

FIELD OF THE INVENTION

The present invention relates generally to a method of coating a component, a method of forming cooling holes, and a water soluble aperture plug.

BACKGROUND OF THE INVENTION

When turbines are used on aircraft or for power generation, they are typically run at a temperature as high as possible, for maximum operating efficiency. Since high temperatures can damage the alloys used for the components, a variety of approaches have been used to raise the operating temperature of the metal components. One approach calls for the incorporation of internal cooling channels in the component, through which cool air is forced during engine operation. The cooling holes can be formed in the substrate by specialized laser-drilling techniques. Cooling air (usually provided by the engine's compressor) is fed through the holes from the cooler side to the hot side of the combustor wall. As long as the holes remain clear, the rushing air will assist in lowering the temperature of the hot metal surface and preventing melting or other degradation of the component.

Another technique for protecting the metal parts and effectively raising the practical operating temperature of an aircraft engine involves the use of a thermal barrier coating (TBC). The TBC is usually ceramic-based. TBC systems frequently also include a bond coat which is placed between the ceramic coating and the substrate to improve adhesion. The use of TBC's in conjunction with the battery of cooling holes is sometimes the most effective means for protecting an engine part. However, incorporation of both systems can be very difficult. For example, the cooling holes sometimes cannot be formed in the engine part after a TBC has been applied, since lasers usually cannot effectively penetrate both the ceramic material and the metal to form the pattern of holes. If the cooling holes are formed prior to the application of the TBC system, they may become covered and at least partially obstructed when the bond coat and/or TBC is applied. Complete removal of the ceramic-metal material from the holes can be very time-consuming and ineffective, if not impossible. Any obstruction of the holes during engine operation can interfere with the passage of cooling air, can waste compressor power, and can possibly lead to engine component damage due to overheating.

Therefore a component and methods of coating the component and method of making cooling holes in the component that do not suffer from the above drawbacks are desirable in the art.

SUMMARY OF THE INVENTION

According to an exemplary embodiment of the present disclosure, a method of coating a component is provided. The method includes providing the component having a surface and including a plurality of apertures formed therein. The method includes masking at least one of the plurality of apertures with a plug, the plug comprising a removable material. The method includes applying at least one coating to the surface of the component. The method includes eliminating the removable material leaving open apertures in the surface of the coated component.

According to another exemplary embodiment of the present disclosure, a method of forming at least one cooling hole in a component is provided. The method includes providing the component having a surface and including plurality of cooling holes therein. The method includes masking at least one of the plurality of cooling holes with a plug, the plug comprising a water soluble paste. The method includes coating the surface of the component with a bond coat and thermal barrier coating. The method includes dissolving the plug including water soluble paste in water leaving open cooling holes in the surface of the coated component.

According to another exemplary embodiment of the present disclosure, a water-soluble aperture plug is provided. The water-soluble aperture plug includes water soluble high temperature resistant filler material including aluminum oxide ($Al_2O_3$), zirconium oxide ($ZrO_2$), magnesium oxide (MgO), silicon dioxide ($SiO_2$), zircon ($ZrSiO_4$), graphite, tungsten carbide (WC), silicon carbide (SiC), silicon nitride, boron nitride, aluminum nitride and binding agents and dispersants including phosphates, silicates, sugar, salt, gum, resin, polyvinyl alcohol (PVA), polyethylene glycol, and combinations thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of coating a component, method of forming at least one cooling hole in the component and a plug for use with the methods. More specifically, the plug includes water soluble binder material and high temperature resistant filler materials including aluminum oxide ($Al_2O_3$), zirconium oxide ($ZrO_2$), magnesium oxide (MgO), silicon dioxide ($SiO_2$), zircon ($ZrSiO_4$), graphite, tungsten carbide (WC), silicon carbide (SiC), silicon nitride, boron nitride, aluminum nitride and binding agents and dispersants including phosphates, silicates, sugar, salt, gum, resin, polyvinyl alcohol (PVA), polyethylene glycol, and combinations thereof.

One advantage of an embodiment of the present disclosure includes maintaining original shape and dimension of apertures or cooling holes in components. Another advantage of an embodiment is better control of airflow for recoated components. Yet another advantage is faster processing of recoated components. Another advantage of an embodiment is decreased time for cleaning of cooling holes after components are coated or recoated. Yet another advantage of an embodiment is significant labor savings because no drilling is required to clear cooling holes after coating. Yet another advantage is having a high temperature resistant masking material.

Components of the present disclosure can be used in any applications that undergo temperature changes, such as, but not limited to, power generation systems which include, but are not limited to, gas turbines, steam turbines, jet turbines, and other turbine assemblies.

Figure 1:
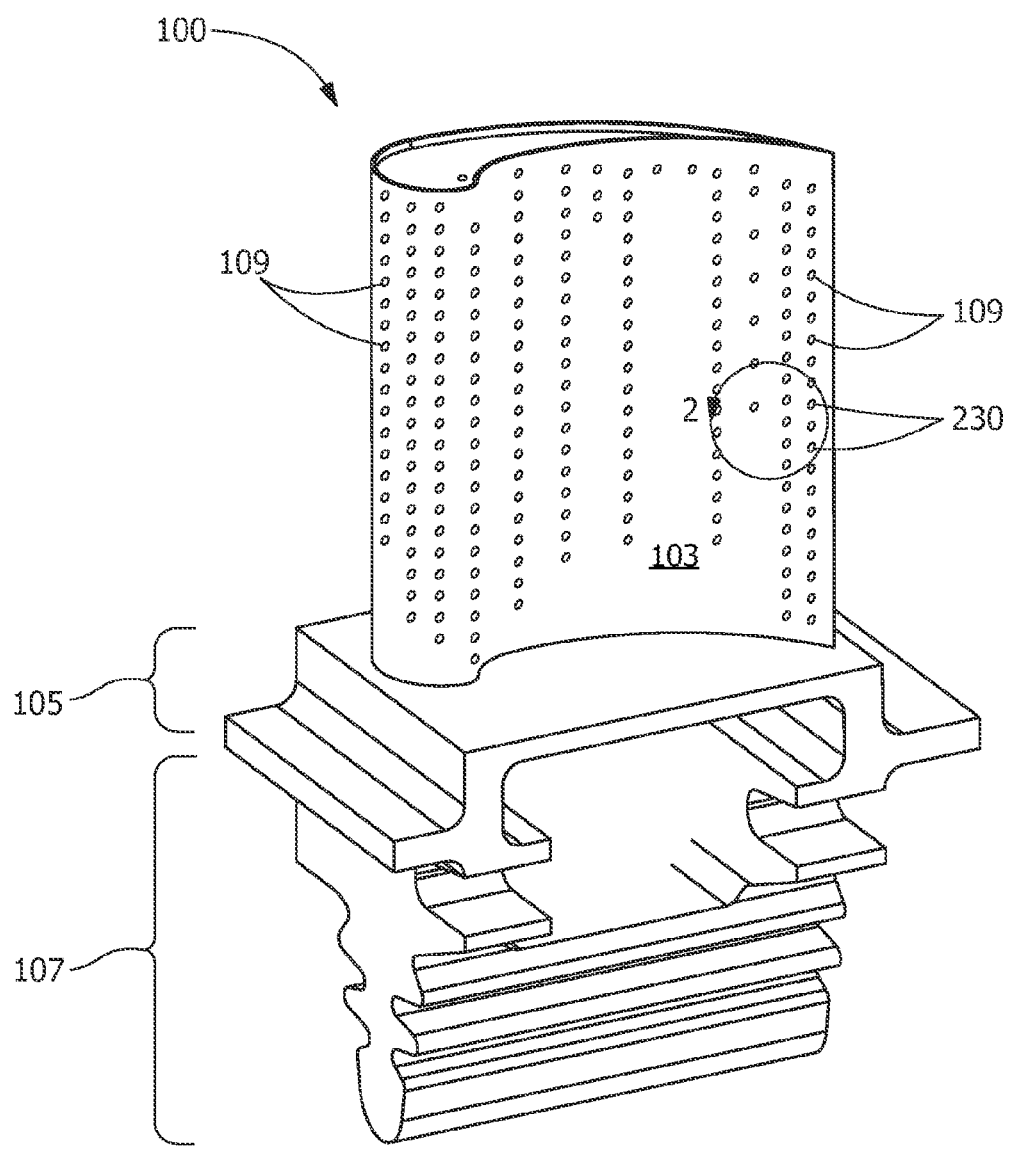
FIG. 1 is a perspective view of a component of the present disclosure.

FIG. 1 is a perspective view of turbine blade 100 that can be used with the method of the present disclosure. Turbine blade 100 has three sections: an airfoil section 103, a platform section 105, and a dovetail section 107. Airfoil section 103 includes a plurality of cooling holes 109 which permit cooling air to exhaust from an interior space of turbine blade 100. Turbine blade 100 is typically fabricated from a high temperature oxidation and corrosion resistant alloy with high temperature strength, such as a nickel-based superalloy. The exterior surface of airfoil section 103 of the turbine blade 100 may be coated with any coating system known in the art for coating on a turbine blade 100 opposed to combustion gases. A known coating system includes a bond coat on the surface of the turbine blade 100, typically comprising an aluminide or MCrAlY (where M=Ni, Co, and/or Fe) and a thermal barrier layer disposed on the bond coating, which may include ceramic materials, such as yttria stabilized zirconia. The thermal barrier coating is typically applied by a process, such as air plasma spray or electron beam physical vapor deposition, that provides the surface with a coating morphology suitable for providing airfoil section 103 surface with resistance to heat. The combination of the bond coating and thermal barrier layer provide airfoil section 103 with long-term resistance to heat and corrosion resulting from contact with the combustion gas stream.

The present disclosure relates to a process of masking cooling holes 109 or apertures 230 of a component 200 before the deposition of a coating material on external surface 220 of component 200. As shown in FIG. 1, component can be a turbine blade 100. Other examples of components 200, include but are not limited to, component having cooling hole 109 or apertures 230, such as, but not limited to, nozzles, vanes, shrouds, buckets, transition pieces and liners, and combinations thereof.

Figure 2:
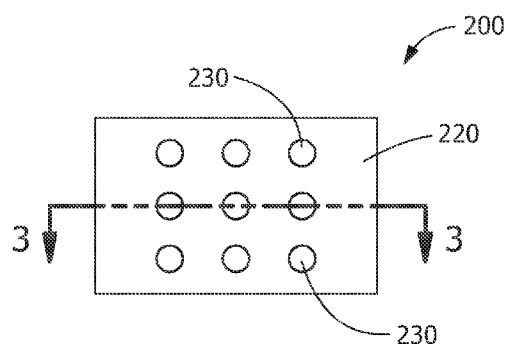
FIG. 2 is a schematic top view of a component of FIG. 1 having a plurality of apertures formed therein of the present disclosure.
Figure 3:
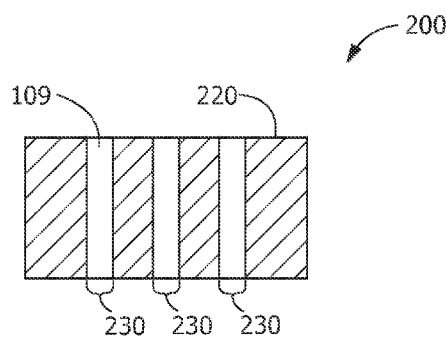
FIG. 3 is a sectional view taken in direction 3-3 of FIG. 2 of the component including the plurality of apertures.

As shown in FIG. 2, a top view of external surface 220 of component 200 is provided including a plurality of apertures 230 formed in external surface 220. FIG. 3 is a sectional view taken in direction 3-3 of FIG. 2 of component 200 including plurality of apertures 230 that are empty. External surface 220 can be prepared for coating by machining, grit-blasting, sanding, etching, or combinations thereof, to remove any old coatings or to prepare external surface 200 for coating.

Figure 4:
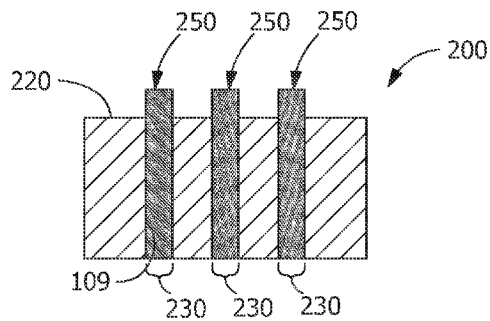
FIG. 4 is a schematic view of the plurality of apertures each filled with a plug according to the present disclosure.

As shown in FIG. 4, plurality of apertures 230 are filled with or masked by plugs 250. Plugs 250 substantially fill plurality of apertures 230. Plugs 250 can be substantially even with external surface 220 of component 200 or situated slightly above external surface 200 of component 200, as shown in FIG. 4. Plugs 250 comprise a removable material. Removable material which forms plugs 250 is applied using, for example, but not limited to, a syringe, caulking-tube, or combination thereof. Removable material includes high temperature resistant filler materials, binding agents, or combinations thereof. As used herein "high temperature resistant filler materials" are materials that generally withstand temperatures greater than about 315° C. (about 600° F.) or materials that withstand temperatures generally in the range of about 315° C. (about 600° F.) to about 982° C. (about 1800° F.). Removable material is selected from materials that are water soluble, magnetic, chemically dissolvable, or heat degradable. Suitable examples of removable material for plugs 250 include, but are not limited to, high temperature resistant filler materials, such as but not limited to, aluminum oxide ($Al_2O_3$), zirconium oxide ($ZrO_2$), magnesium oxide (MgO), silicon dioxide ($SiO_2$), zircon ($ZrSiO_4$), tungsten carbide (WC), silicon carbide (SiC), silicon nitride, boron nitride, aluminum nitride, and graphite. Suitable examples of removable material include binding agents, viscosity adjusters, and dispersants, such as, but not limited to, phosphates, silicates, sugar, high temperature salts, gum, resins, polyvinyl alcohol (PVA), polyethylene glycol, polymethyl methacrylate (PMMA), and combinations thereof.

A suitable example of a solvent for forming and shaping plug 250 includes water. Other suitable examples of solvents for forming and shaping plugs 250 include alcohol, acetone, terpineol. In one embodiment, plugs 250, prior to drying, include about 50% to 80% by weight high temperature resistant filler material, about 10% to about 40% by weight binding agent, and about 5%-25% by weight water or alternatively about 55% to 75% by weight high temperature resistant filler material, about 15% to about 35% by weight binding agent, and about 8%-20% by weight water, or alternatively about 60% to 70% by weight high temperature resistant filler material, about 20% to about 30% by weight binding agent, and about 10%-15% by weight water. After drying, plugs 250 include only refectory material and binding agents.

Figure 5:
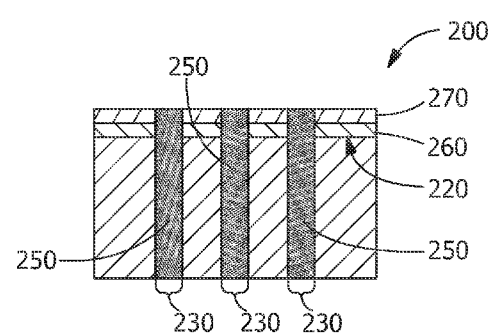
FIG. 5 is a schematic view of applying a plurality of layers to the component according to the present disclosure.

Plug 250 is dried using any suitable method, such as, but not limited to, air drying, heat, or chemicals to form the solid plug 250 in apertures 230 of component 200. After plug 250 is dried, external surface 220 of component is coated with least one coating. As shown in FIG. 5, a first coating 260 is applied to external surface 220 of component 200 and a second coating 270 is applied to first coating 260. In one embodiment, first coating 260 is a bond coating. Suitable examples of bond coating, include, but are not limited to, MCrAlX coatings, where M is cobalt, nickel, iron, or combinations thereof, X is an active element, such as yttrium (Y) and/or silicon (Si) and/or at least one rare earth element or hafnium (Hf). In one embodiment, second coating 270 is a thermal barrier coating (TBC). Suitable examples of TBCs, include, but are not limited to, ceramic coatings, such as zirconium oxide ($ZrO_2$) the crystalline structure of which may be partially or completely stabilized by adding yttrium oxide ($Y_2O_3$).

Figure 6:
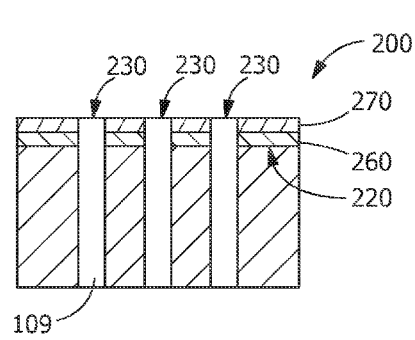
FIG. 6 is a schematic view of the plurality of apertures an exemplary alternative embodiment of at least one dissimilar metallic layer coated on a component of the present disclosure.

First coating 260 and second coating 270 are applied at elevated temperatures, generally greater than about 400° C. Plug 250 withstands the high temperatures necessary for application of coatings. After coatings 260 and 270 are applied, component 200 is cooled. During application of coatings 260 and 270, organics of plug 250 may be "burned" off depending on the temperature that surface 220 reaches during coatings processing. Examples of organics that are burned-off include carbon containing materials, and material containing sulfur that may be present in binding agents, surfactants, dispersants, wetting agents. Most organics, the burn off between 300° C.-800° C. To remove plug 250, depending on the composition of removable material of plug 250, component 200, including plug 250 can be immersed in a bath of water, until the plug 250 dissolves, leaving clear apertures 230 as shown in FIG. 6. The water bath causes the plug 250 to dissolve in the water and frees apertures 230, leaving component 200 having coatings 260 and 270 thereon and apertures 230 free from any coating or other materials, without having to engage in hand drilling to clear apertures 230. To aid the plug removal process, an external force such as mechanical (e.g. pressurized water) or acoustical vibration (e.g. ultrasonics) may be employed in the water bath.

In another embodiment, a non-aqueous solvent bath is used to remove or dissolve plug 250. The non-aqueous solvent is selected to react with or dissolve the high temperature resistant filler material of plug 250. Suitable examples of non-aqueous or waterless solvents, include, but are not limited to, alcohols (e.g., acetone), ammonia, weak acids, (e.g., such as citric acid), 5-10% HCl, nitric acid, sulfuric acid, perchloric acid, boric acid, or terpineol. In one embodiment, removable material of plug 250 includes high temperature resistant filler materials and binders that are soluble in a non-aqueous solvent. To remove plug 250 component 200 including plug 250 is immersed in a bath of the non-aqueous solvent. An example of removable material for plug 250 including high temperature resistant filler material and binders is, but is not limited to, an alumina filler mixed with polymethyl methacrylate (PMMA) in an acetone solvent using PMMA as binder.

In yet another embodiment, removable material of plug 250 includes an oxide filler. To remove plug 250 including an oxide filler, an acidic descaler is used. Suitable examples of acidic descalers include, but are not limited to, citric acid, hydrochloric acid, nitric acid, sulfuric acid, perchloric acid, or boric acid.

In another embodiment, plug 250 includes impure graphite powder which may be burned off at 400° C. in air or in the presence of water. To remove plug 250 including graphite powder, component 200 is heat treated at about 350-650° C., to degrade plug 250 including graphite powder for easy removal. In an alternative embodiment, plug 250 removal may also be accomplished by high pressure air spraying, acid cleaning, ultrasonic treatment in water, or a combination thereof.

In another embodiment, plug 250 is magnetic. For high temperature coating processes such as High Velocity Oxygen Fuel (HVOF) or Air Plasma Spray (APS), the magnetic plug 250 includes magnetic oxide with a Curie Temperature of greater than about 600° C., and that magnetic oxide remains magnetic after the coating process. A suitable example of a magnetic oxide having a Curie Temperature of greater than 600° C., includes, but is not limited to, of Iron Oxide ($Fe_2O_3$), which has a Curie Temperature of 622° C. A magnet is used to remove plug 250 including magnetic oxide. During removal, magnet is placed adjacent to plug 250 including magnetic oxide material and magnet attracts plug 205 out of apertures 230, leaving a component 200 having a coating on the surface and clean apertures 230.

Figure 7:
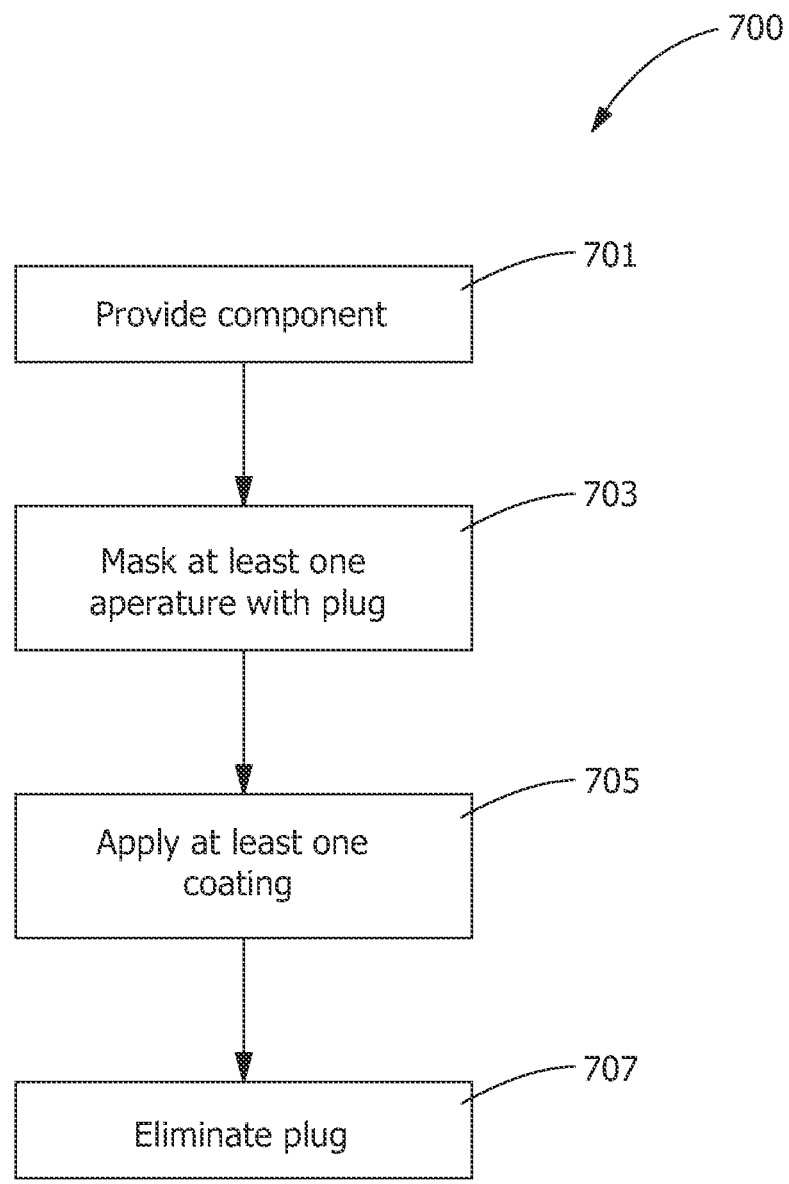
FIG. 7 is a flow chart of an exemplary method of making a component of the present disclosure.

FIG. 7 illustrates a method 700 of coating a component 200 (see FIGS. 4-6). Method 700 includes providing component 200, step 701 (see FIGS. 2-3). Method 700 includes masking at least one aperture 230 with plug 250, step 703 (see FIG. 4). Masking includes filling plurality of apertures 230 with plug 250 including removable material, wherein the removable material is initially in a paste form and applied using any suitable application means, such as, but not limited to, manual application, syringes, caulk-guns, and combinations thereof. Depending on the viscosity of the removable material, it may be dried using any suitable means, prior to application of coatings. Method 700 includes applying at least one coating 260, 270 to external surface 220 of component 200, step 705 (see FIG. 5). Method 700 includes eliminating plug 250 including removable material leaving open apertures 230 in external surface 220 of the coated component 200, step 707 (see FIG. 6). Step of eliminating, step 707, can include a process for breaking up, degrading, and dissolving removable material, such as by using water to dissolve removable material with or without the aid of external forces (e.g., pressure, acoustics, magnets, etc.), using chemical means, heat treating, magnetic means, or combinations thereof. After the step of eliminating, step 707, apertures 230 can further be finished by drilling apertures 230 that are visible on coated component 200.

Figure 8:
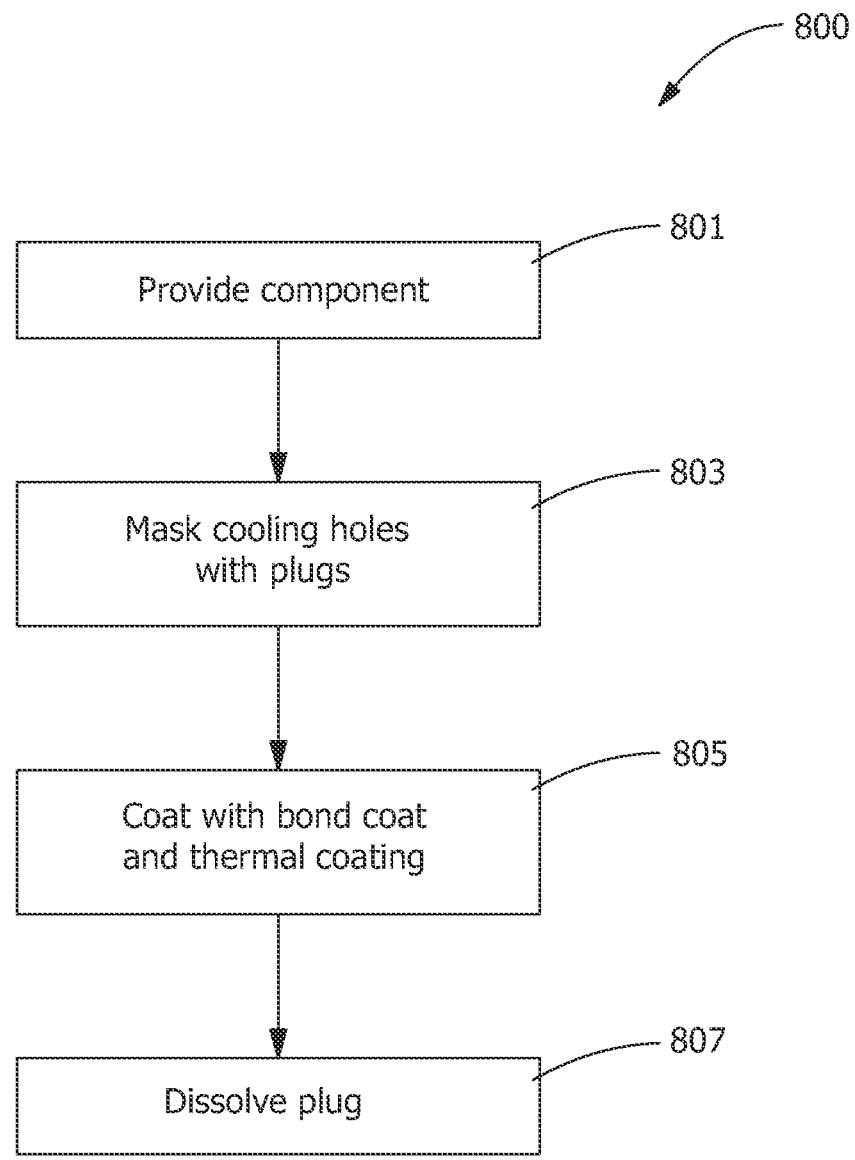
FIG. 8 is a flow chart of an alternative exemplary method of forming cooling holes in a component of the present disclosure.

FIG. 8 illustrates method 800 of forming at least one cooling hole 109 in a component 200 (see FIG. 1). As shown in FIGS. 1-6, apertures 230 can be cooling holes 109. Method 800 includes providing component 200 having external surface 220 and including a plurality of cooling holes 109, step 801 (see FIGS. 1-3). Method 800 includes masking at least one of plurality of cooling holes 109 with plug 250, plug 250 comprising a water soluble paste, step 803 (see FIG. 4). Suitable examples of water soluble paste include about 50% to 80% by weight refractory material and about 10% to about 40% by weight binding agent, and 5-25% water before water soluble paste has dried to form plug 250 (see FIG. 4) Method 800 includes coating external surface 220 of component 200 with bond coat 260 and thermal barrier coating 270, step 805 (see FIG. 5). Method 800 includes dissolving plug 250 including water soluble paste in water leaving open cooling holes 109 in external surface 220 of coated component 200, step 807 (see FIG. 6).

The following examples are intended to further illustrate the present disclosure. They are not intended to limit the disclosure in any way.

EXAMPLES

Example 1

In one embodiment, plug 250 comprises, prior to drying, 60 g alumina flour, 25 g 30% colloidal silica binder, and 15 g water. This composition is formed into a desired plug shape and is applied manually onto aperture 230, a cooling hole opening on a surface of a gas turbine stage 1 nozzle. A High Velocity Oxygen Fuel (HVOF) Thermal Spray process is used to apply first coating 260, a bond coating, to surface 220 of component 200. Next, second coating 270, a TBC, is applied to first coating 260 using Air Plasma Spray (APS) process. Next, component 200 is dipped into a bath containing warm water to dissolve plug 250, leaving a component 200 having a bond coat, a TBC and open apertures 230. After removing plugs 250 from apertures 230, final heat treatment is applied to component 200 to cure the applied bond coating and TBC.

Example 2

In another embodiment, plug 250 comprises a graphite paste. The graphite paste includes fine carbon powder dispersed in a solvent (aqueous or non-aqueous) and may include special additives for adjusting viscosity, preventing adhesion to cooling holes, and preventing corrosion. Graphite paste is applied manually into apertures 230, or cooling hole openings, on surface 220 of component 200, a gas turbine stage 1 nozzle. A HVOF Thermal Spray process is used to apply first coating 260, a bond coating to surface 220 of component 200. Next, second coating 270, a TBC, is applied to first coating 260 using an APS process. Component 200 including plug 250 is heated in an air furnace to about 538° C. (about 1000° F.) to oxidize/burn off plug 250 including graphite in apertures 230. After burn-off any remaining bits or pieces of plug 250 in apertures 230 is air blasted to remove the remnant powder. After removing plugs 250 from apertures 230, final heat treatment is applied to the component 200 to cure the applied bond coating and TBC.

Example 3

In another embodiment, plug 250 comprises a mixture of acetone, polymethyl methacrylate (PMMA), and alumina. In making plug 250, 20 wt % PMMA is dissolved in acetone, then alumina is added to maximize the solids content to form a paste. The paste is applied to apertures 230, or in the cooling hole openings on a surface 220 of component 200, a gas turbine stage 1 nozzle. The paste is dried forming plugs 250 in apertures 230. A HVOF Thermal Spray process is used to apply first coating 260, a bond coating to surface 220 of component 200. Next, second coating 270, a TBC, is applied to first coating 260 using an APS process. After applying first coating 260 and second coating 270, component 200 is dipped into an acetone tank to dissolve PMMA in plug 250. Acetone dissolves plug 250 leaving open apertures 230. Alternatively, ultrasonication may be used in combination with the acetone bath to remove plug 250 from apertures 230. After removing plugs 250 from apertures 230, final heat treatment is applied to the component 200 to cure the applied bond coating and TBC.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of coating a component comprising:
   providing the component having a surface and including a plurality of apertures formed therein;
   masking at least one of the plurality of apertures with at least one plug, the at least one plug comprising a removable material;
   drying the removable material;
   after drying the removable material, applying at least one coating to the surface of the component, wherein applying the at least one coating subjects the at least one plug to a temperature of at least 400° C. and the at least one plug withstands the temperature of at least 400° C.; and
   contacting the component with a liquid solution to completely eliminate the at least one plug in one step, leaving at least one open aperture in the surface of the coated component, the at least one open aperture maintaining an original shape and a cross-sectional dimension of the at least one aperture through the at least one coating;
   wherein the at least one plug, prior to drying, comprises about 50% to 80% by weight of at least one high temperature resistant inorganic filler material, about 10% to about 40% by weight of at least one binding agent, and about 5% to about 25% by weight liquid solvent.

2. The method of claim 1, wherein the method includes, prior to the step of masking, preparing the component by machining, grit-blasting, sanding, etching, or combinations thereof.

3. The method of claim 1, wherein the removable material is selected from the group consisting of water soluble materials, chemically dissolvable materials, and combinations thereof.

4. The method of claim 1, wherein the at least one high temperature resistant inorganic filler material is selected from the group consisting of aluminum oxide ($Al_2O_3$), zirconium oxide ($ZrO_2$), silicon dioxide ($SiO_2$), zircon ($ZrSiO_4$), graphite, and combinations thereof, and the at least one binding agent is selected from the group consisting of phosphate, silicates, sugar, gum, resin, polyvinyl alcohol (PVA), and combinations thereof.

5. The method of claim 1, wherein the component is selected from the group consisting of a nozzle, a blade, a vane, a shroud, a bucket, a transition piece, a liner, and combinations thereof.

6. The method of claim 1, wherein the step of applying at least one coating includes applying a first coating at a first temperature and applying a second coating at a second temperature.

7. The method of claim 6, wherein the first coating is a bond coating and the second coating is a thermal barrier coating.

8. The method of claim 1, wherein, after the step of eliminating the at least one plug, apertures are finished using a drill.

9. The method of claim 1, further comprising, after the eliminating of the at least one plug, applying a heat treatment to cure the at least one coating.

10. A method of forming at least one cooling hole in a component comprising:
    providing the component having a surface and including plurality of cooling holes therein;
    masking at least one of the plurality of cooling holes with at least one plug, the at least one plug comprising a water soluble paste;
    drying the water soluble paste;
    after drying the water soluble paste, coating the surface of the component with a bond coat a and thermal barrier coating, wherein coating the surface of the component with the bond coat and the thermal barrier coating subjects the at least one plug to a temperature of at least 400° C. and the at least one plug withstands the temperature of at least 400° C.; and
    contacting the component with a liquid solution comprising water to dissolve and completely remove the at least one plug in one step, leaving at least one open cooling hole in the surface of the coated component, the at least one open cooling hole maintaining an original shape and a cross-sectional dimension of the at least one cooling hole through the bond coat and the thermal barrier coating;
    wherein the water soluble paste, prior to drying, comprises about 50% to 80% by weight of at least one high temperature resistant inorganic filler material, about 10% to about 40% by weight of at least one binding agent, and about 5% to about 25% by weight water.

11. The method of claim 10, wherein the method includes, prior to the step of applying the water soluble paste, preparing the component by machining, grit-blasting, sanding, etching, or a combination thereof.

12. The method of claim 10, wherein the component is selected from the group consisting of a nozzle, a blade, a vane, a shroud, a bucket, a transition piece, a liner, and combinations thereof.

13. The method of claim 10, wherein the water soluble paste is applied using a syringe, caulking-tube, brush, or combination thereof.

14. The method of claim 10, wherein the coating the surface of the coated component comprises applying the bond coat using high velocity oxygen fuel spraying (HVOF).

\* \* \* \* \*